US008649643B2

(12) United States Patent
Jeong (10) Patent No.: US 8,649,643 B2
(45) Date of Patent: Feb. 11, 2014

(54) OPTICAL HYBRID CIRCUIT AND OPTICAL RECEIVER

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 13/404,505

(22) Filed: Feb. 24, 2012

(65) Prior Publication Data

US 2012/0237154 A1    Sep. 20, 2012

(30) Foreign Application Priority Data

Mar. 18, 2011  (JP) ................................. 2011-060830

(51) Int. Cl.
*G02B 6/42* (2006.01)
(52) U.S. Cl.
USPC .......................................................... 385/39
(58) Field of Classification Search
USPC .................................................... 385/39, 48
See application file for complete search history.

(56) References Cited

U.S. PATENT DOCUMENTS

| 8,306,369 | B2* | 11/2012 | Jeong ................................. 385/2 |
| 8,401,351 | B2* | 3/2013 | Inoue et al. ...................... 385/45 |
| 2010/0322631 | A1* | 12/2010 | Nagarajan et al. .............. 398/65 |
| 2011/0129236 | A1* | 6/2011 | Jeong ............................. 398/212 |
| 2011/0158574 | A1* | 6/2011 | Jeong ................................. 385/2 |
| 2011/0243556 | A1* | 10/2011 | Nagarajan et al. .............. 398/43 |
| 2012/0243827 | A1* | 9/2012 | Jeong ............................... 385/24 |
| 2013/0170833 | A1* | 7/2013 | Nagarajan et al. .............. 398/48 |
| 2013/0236172 | A1* | 9/2013 | Suzuki ............................. 398/43 |

FOREIGN PATENT DOCUMENTS

JP    2010-171922 A1    8/2010

OTHER PUBLICATIONS

E.C.M. Pennings, et al.; "Ultracompact, All-Passive Optical 90—Hybrid on InP Using Self-Imaging;" IEEE Photonics Technology Letters; vol. 5; No. 6; Jun. 1993; pp. 701-703/p. 1 of specification.
D. Hoffmann, et al.; "Integrated Optics Eight-Port 90 Hybrid on LiNbO3;" Journal of Lightwave Technology; vol. 7; No. 5; May 1989; pp. 794-798/p. 2 of specification.

* cited by examiner

*Primary Examiner* — Sung Pak
(74) *Attorney, Agent, or Firm* — Kratz, Quintos & Hanson, LLP

(57) ABSTRACT

An optical hybrid circuit includes: a first optical coupler including a first input channel, a second input channel, a first output channel, and a second output channel; a second optical coupler including a third input channel, a fourth input channel, a third output channel, and a fourth output channel; a third optical coupler including a fifth input channel, a sixth input channel, a fifth output channel, and a sixth output channel; a fourth optical coupler including a seventh input channel, an eighth input channel, a seventh output channel, and an eighth output channel; a fifth optical coupler including a ninth input channel, a tenth input channel, a ninth output channel, and a tenth output channel, the ninth input channel coupled to the first output channel; and a sixth optical coupler including an eleventh input channel, a twelfth input channel, an eleventh output channel, and a twelfth output channel.

20 Claims, 11 Drawing Sheets

OPTICAL HYBRID CIRCUIT AND OPTICAL RECEIVER

CROSS-REFERENCE TO RELATED APPLICATIONS

This application claims the benefit of priority from Japanese Patent Application No. 2011-60830 filed on Mar. 18, 2011, the entire contents of which are incorporated herein by reference.

FIELD

The embodiments discussed herein are related to an optical hybrid circuit and an optical receiver.

BACKGROUND

A large amount of optical information is transmitted in a multi-level phase shift keying modulation format. An optical receiver including a 90-degree hybrid may be used to demodulate multi-level phase shift keying signals. The 90-degree hybrid exhibits output forms having different branching ratios based on the phase modulation state of signals. The monolithic integration of the 90-degree hybrid on a semiconductor substrate reduces the size of the 90-degree hybrid and allows the 90-degree hybrid to exhibit broad wavelength bandwidth characteristics.

For example, a 90-degree hybrid having a monolithically integratable optical waveguide structure includes a 4:4 multimode interference (MMI) coupler disclosed in E. Pennings, et. al., "Ultracompact, all-passive optical 90°-hybrid on InP using self-imaging", *IEEE Photonics Technology Letters*, Vol. 5, No. 6, pp. 701-703, June 1993. In the 4:4 MMI coupler, two channels having central axial asymmetry out of four input channels on the input side are appropriately selected to obtain a 90-degree out-of-phase relationship due to the mode interference effect in an MMI region.

Related art is disclosed in, for example, Japanese Laid-open Patent Publication No. 2010-171922; E. Pennings, et. al., "Ultracompact, all-passive optical 90°-hybrid on InP using self-imaging", *IEEE Photonics Technology Letters*, Vol. 5, No. 6, pp. 701-703, June 1993; and D. Hoffmann, et al., "Integrated Optics Eight-Port 90° Hybrid on LiNbO$_3$", *Journal of Lightwave Technology*, Vol. 7, NO. 5, pp. 794-798, May 1989.

SUMMARY

According to an aspect of the embodiments, an optical hybrid circuit includes: a first optical coupler including a first input channel, a second input channel, a first output channel, and a second output channel; a second optical coupler, provided substantially parallel to the first optical coupler, including a third input channel, a fourth input channel, a third output channel, and a fourth output channel; a third optical coupler including a fifth input channel, a sixth input channel, a fifth output channel, and a sixth output channel, the fifth input channel being coupled to the second output channel, and the sixth input channel being coupled to the third output channel; a fourth optical coupler including a seventh input channel, an eighth input channel, a seventh output channel, and an eighth output channel, the seventh input channel being coupled to the fifth output channel, the eighth input channel being coupled to the sixth output channel; a fifth optical coupler including a ninth input channel, a tenth input channel, a ninth output channel, and a tenth output channel, the ninth input channel being coupled to the first output channel, the tenth input channel being coupled to the seventh output channel; and a sixth optical coupler including an eleventh input channel, a twelfth input channel, an eleventh output channel, and a twelfth output channel, the eleventh input channel being coupled to the eighth output channel, the twelfth input channel being coupled to the fourth output channel.

Additional advantages and novel features of the invention will be set forth in part in the description that follows, and in part will become more apparent to those skilled in the art upon examination of the following or upon learning by practice of the invention.

DESCRIPTION OF EMBODIMENTS

Figure 1A:
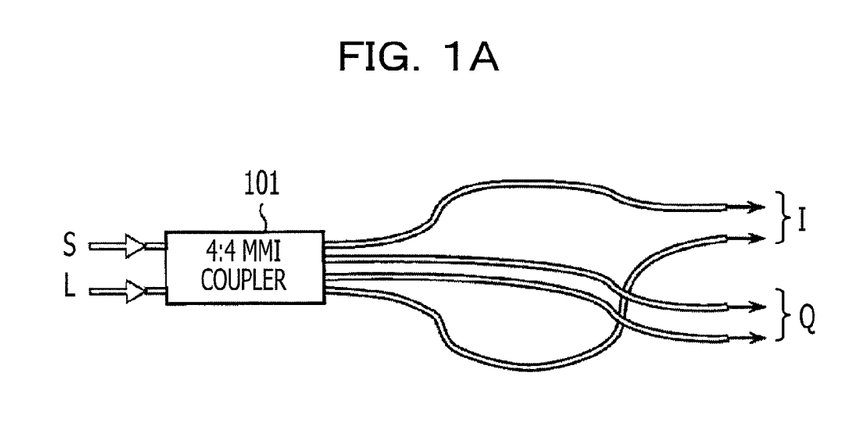
FIG. 1A illustrates an exemplary 4:4 MMI coupler.

FIG. 1A illustrates an exemplary 4:4 MMI coupler. In FIG. 1A, when a signal S and local oscillation light LO enter two input channels out of four input channels of an MMI coupler 101, two in-phase signals I and two quadrature phase signals Q are output from four output channels. A 4:4 MMI coupler functions as a 90-degree hybrid. Since a pair of in-phase signals I are output from two channels on the output side, two waveguide crossings may be used. When a waveguide crossing is formed in the same layer, excess loss or crosstalk may occur. In order to reduce excess loss or crosstalk, the crossing waveguides may intersect. Since a pair of waveguides have substantially the same optical lengths, the element size may be increased.

Figure 1B:
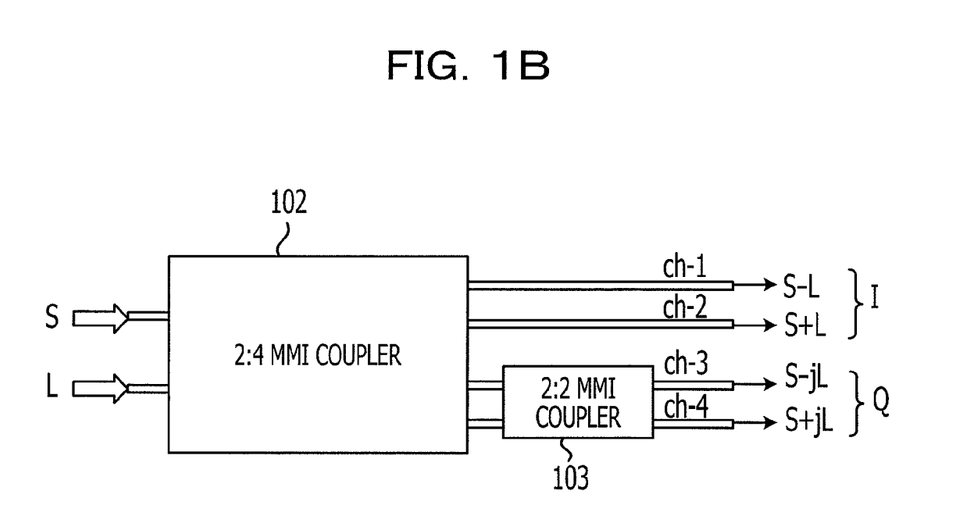
FIG. 1B illustrates an exemplary 2:4 MMI coupler.

FIG. 1B illustrates an exemplary 2:4 MMI coupler. In FIG. 1B, a 2:4 MMI coupler 102 and a 2:2 MMI coupler 103 are used. A pair of signals (S−L) and (S+L) having an in-phase relationship I are output from the 2:4 MMI coupler 102. A pair of signals (S+jL) and (S−jL) having a quadrature phase relationship Q are output from the 2:2 MMI coupler 103.

Figure 2A:
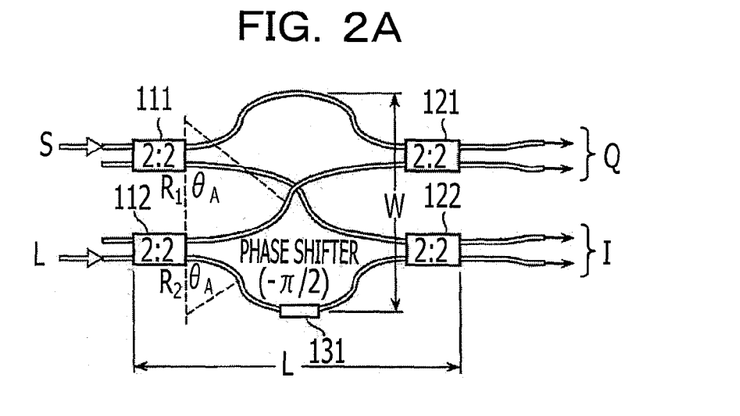
FIG. 2A illustrates an exemplary circuit including 2:2 optical couplers.

FIG. 2A illustrates an exemplary circuit including 2:2 optical couplers. In FIG. 2A, four 2:2 optical couplers and one phase shifter are used in combination. Two 2:2 optical couplers 111 and 112 are disposed on the input side. Two inner channels out of four output channels intersect, and are coupled to input channels of two 2:2 optical couplers 121 and 122 on the output side. The number of waveguide crossings is reduced to one. Waveguides in the two inner channels may intersect at 90 degrees, and the two outer channels may have substantially the same optical length as the channels paired therewith. A phase shifter 131 is coupled to one of the outer channels, for example, the lower channel illustrated in FIG. 2A, and may obtain a phase difference of $\pm(\pi/2)$. Two quadrature signals Q and two in-phase relation I are discriminated from the two 2:2 optical couplers 121 and 122 on the output side. Each of the intersecting two inner channels may have a curvature radius $R_1$, and each of the two outer channels may have a curvature radius $R_2$ given by $R_2=R_1/2$. The width defined by the two outer channels may be substantially equal to the width W of a 90-degree hybrid. The length from an input side end surface of the 2:2 optical couplers 111 and 112 on the input side to an output side end surface of the 2:2 optical couplers 121 and 122 on the output side may be substantially equal to the length L of the 90-degree hybrid. The occupying area (or dimension) D of the 90-degree hybrid may be approximated to D=W*L. Each optical coupler may have a length of 105 μm. The crossing channels may be bent at an angle $\theta_A$ from the output end surfaces of the 2:2 optical couplers 111 and 112 to the point at which the channels intersect, and the crossing angle may be given by $2\theta_A$.

Figure 2B:
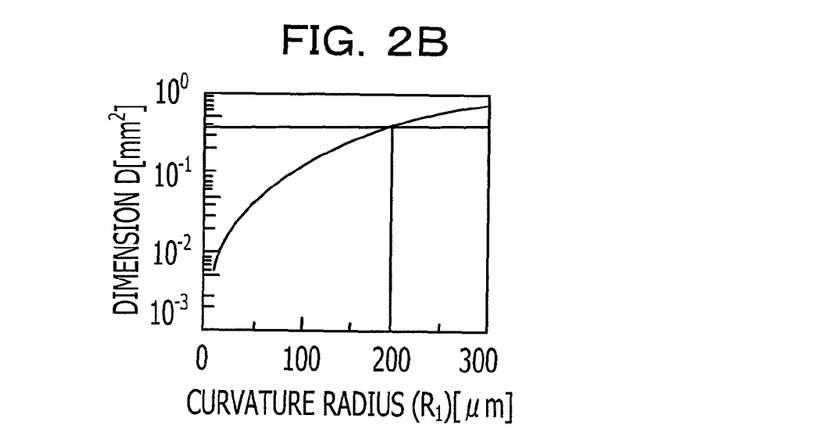
FIG. 2B illustrates an exemplary relationship between an occupying area and a curvature radius.

FIG. 2B illustrates an exemplary relationship between an occupying area and a curvature radius. The relationship illustrated in FIG. 2B may be a relationship between the occupying area D of the 90-degree hybrid and the curvature radius $R_1$. The crossing angle may be 90 degrees. The horizontal axis represents the curvature radius $R_1$ plotted on a linear scale. The vertical axis represents the occupying area D plotted on a logarithmic scale. As the curvature radius $R_1$ increases, the occupying area D increases exponentially. The curvature radius $R_1$ may be large in order to reduce the excess loss at the bending region, and may be, for example, 200 μm. The occupying area D may be less than approximately 0.4 mm$^2$.

Figure 2C:
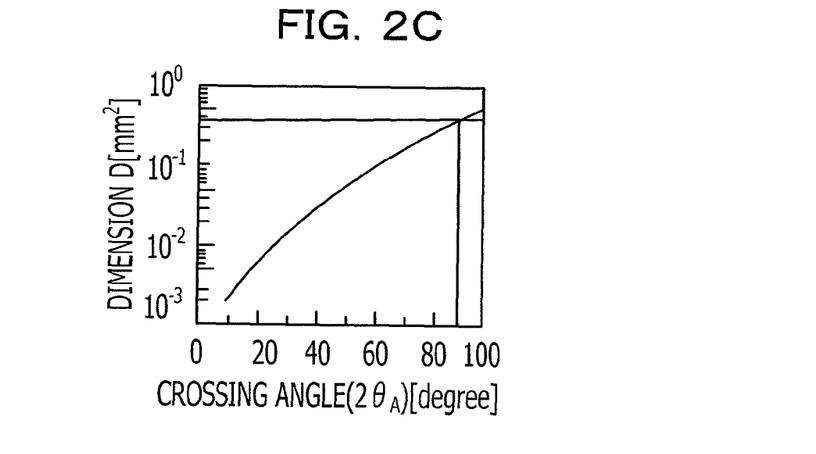
FIG. 2C illustrates an exemplary relationship between an occupying area and a crossing angle.

FIG. 2C illustrates an exemplary relationship between an occupying area and a crossing angle. The relationship illustrated in FIG. 2C may be a relationship between the occupying area D of the 90-degree hybrid and the crossing angle ($2\theta_A$) of the crossing channels. The curvature radius $R_1$ may be 200 μm. The horizontal axis represents the crossing angle ($2\theta_A$) plotted on a linear scale. The vertical axis represents the occupying area D plotted on a logarithmic scale. As the crossing angle ($2\theta_A$) increases, the occupying area D increases exponentially. The crossing angle $2\theta_A$ may be 90 degrees, and the occupying area D may be less than approximately 0.4 mm$^2$.

Figure 3A:
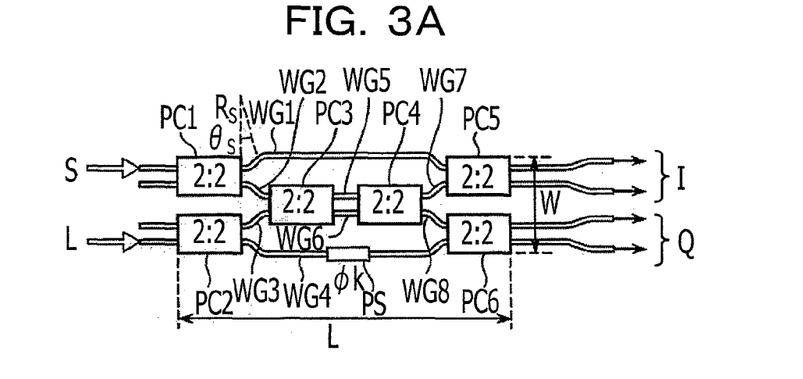
FIGS. 3A and 3B illustrate an exemplary optical hybrid circuit.
Figure 3B:
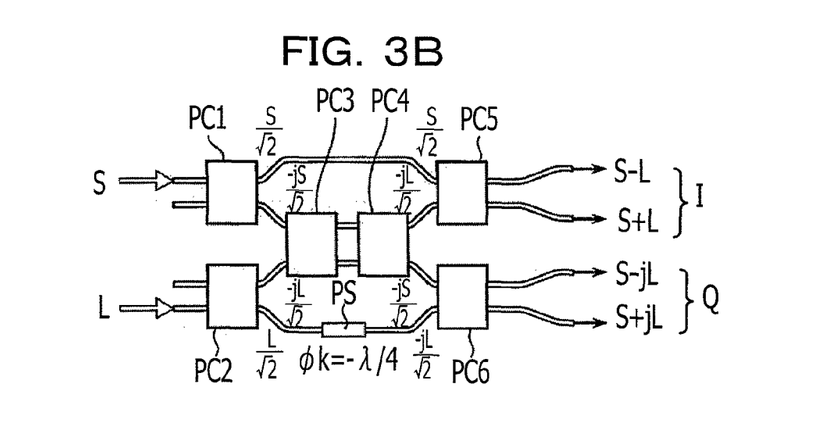

FIGS. 3A and 3B illustrate an exemplary optical hybrid circuits. As illustrated in FIG. 3A, an optical hybrid circuit includes a first optical coupler (or photocoupler) PC1 having first and second input channels and first and second output channels; a second optical coupler PC2 disposed parallel to the first optical coupler PC1 and having third and fourth input channels and third and fourth output channels; a third optical coupler PC3 having fifth and sixth input channels and fifth and sixth output channels, the fifth and sixth input channels being coupled to the second and third output channels through optical waveguides WG2 and WG3 of substantially the same optical length, respectively; a fourth optical coupler PC4 having seventh and eighth input channels and seventh and eighth output channels, the seventh and eighth input channels being coupled to the fifth and sixth output channels through optical waveguides WG5 and WG6 of substantially the same optical length, respectively; a fifth optical coupler PC5 having ninth and tenth input channels and ninth and tenth output channels, the ninth input channel being coupled to the first output channel through an optical waveguide WG1 and the tenth input channel being coupled to the seventh output channel through an optical waveguide WG7; a sixth optical coupler PC6 having eleventh and twelfth input channels and eleventh and twelfth output channels, the eleventh input channel being coupled to the eighth output channel through an optical waveguide WG8 and the twelfth input channel being coupled to the fourth output channel through an optical waveguide WG4; and a phase shifter PS coupled to the optical waveguide WG4.

The optical waveguides WG7 and WG8 may have substantially the same optical lengths. Each of the optical waveguides WG1 and WG4 may have an optical length that is substantially equal to the sum of the optical lengths of the optical waveguide WG2 (or WG3), the third optical coupler PC3, the optical waveguide WG5 (or WG6), the fourth optical coupler PC4, and the optical waveguide WG7 (or WG8). The optical waveguide WG4 includes the phase shifter PS. A signal S is supplied to the first input channel, and local oscillation light (reference light) LO (hereinafter represented by L) is supplied to the fourth input channel. The optical coupler PC5 outputs in-phase signals I, and the optical coupler PC6 outputs quadrature phase signals Q.

As illustrated in FIG. 3B, each of the optical couplers PC1 to PC6 splits each of input signals to be supplied to the two input channels into two signals, phase shifts 90 degrees one of the two signals with respect to the other of the two signals, and supplies the two signals to the output channels. When an input signal is supplied to one channel, the input signal is split into two signals. When an input signal having a vector quantity is split into two 90-degree phase shifted components, the amplitude may be $1/(2^{1/2})$. A signal S is supplied to the first input channel, and local oscillation light (or reference light) L is supplied to the fourth input channel. The first optical coupler PC1 outputs, to the first and second output channels, two signals into which the signal S is split and which are phase shifted 90 degrees. The second optical coupler PC2 outputs, to the third and fourth output channels, two signals into which the reference light L is split and which are phase shifted 90 degrees. The third and fourth optical couplers PC3 and PC4 generate, for example, outputs by swapping their inputs. The fifth optical coupler PC5 receives the component of the signal S and the $-\pi/2$ phase shifted component of the reference light L, and outputs in-phase signals S−L and S+L. The sixth optical coupler PC6 receives the $-\pi/2$ phase shifted component of the signal S and the component of the reference light L, and outputs quadrature signals S−jL and S+jL.

For example, in the upper portion of FIG. 3B excluding the optical couplers PC3 and PC4, the optical couplers PC1 and PC5, may operate as a Mach-Zehnder interferometer, and the optical couplers PC2 and PC6 may operate as a Mach-Zehnder interferometer in the lower portion of FIG. 3B. The optical couplers PC3 and PC4, which are included in a new Mach-Zehnder interferometer, are coupled in series to internal arms of the upper and lower Mach-Zehnder interferometers.

The signal S and the reference light L may be represented by the following formulas:

$$S=P_S^{1/2}\exp[-j\cdot\Psi_S]$$

$$L=P_L^{1/2}\exp[-j\cdot\Psi_L],$$

where $P_S$ and $P_L$ denote the intensities of the signal S and the reference light L, respectively, and $\Psi_S$ and $\Psi_L$ denote the phases of the signal S and the reference light L, respectively. The signal S and the reference light L may have substantially the same frequency components. The phase relationship may be rotated 90 degrees by the Mach-Zehnder interferometer including the third and fourth optical couplers PC3 and PC4. The relative phase relationship at the four output channels may be S−L, S+L, S−jL, and S+jL, and may have a quadrature phase relationship. The optical hybrid circuit having the above configuration functions as a 90-degree hybrid.

In each of the upper and lower Mach-Zehnder interferometers illustrated in FIG. 3B, one arm extends through two optical couplers, and the other arm may form a single-mode waveguide. The two arms in each pair may have different optical path lengths. An excess phase shift $\delta\phi_{EX}$ caused by the optical path length difference may occur. When a phase shift $\delta\phi_{EX}$ occurs, the quadrature phase relationship may be shifted in proportion to the −2-fold shift of $\delta\phi_{EX}$.

An index FM indicates the amount of change relative to the quadrature phase relationship, and may be represented by the following formula:

$$FM=(\rho+\pi)/2-2\cdot\delta\phi_{EX}(\text{radian}),$$

where $\rho$ is an arbitrary integer.

The desired quadrature phase relationship is represented by the following formula:

$$FM=\pm\pi/2(\text{radian}).$$

In order to achieve the desired quadrature phase relationship, the following formula may be set:

$$\phi k=(\rho+\pi)/2+2\cdot\delta\phi_{EX}(\text{radian}).$$

Figure 3C:
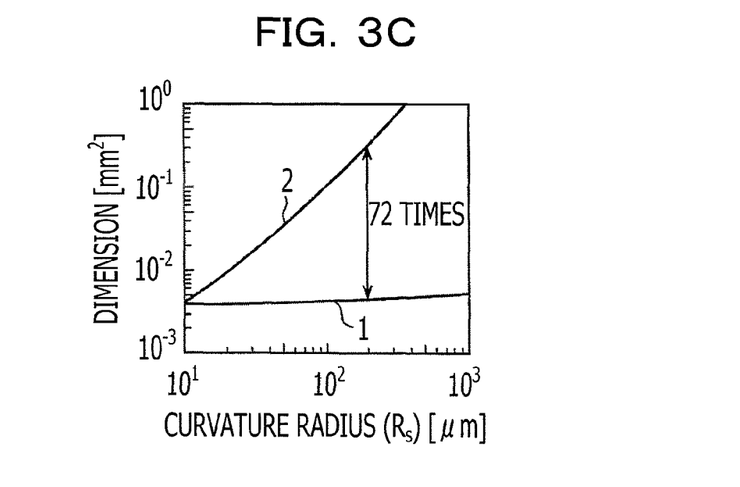
FIG. 3C illustrates an exemplary occupying area of a 90-degree hybrid circuit.

FIG. 3C illustrates an exemplary occupying area of a 90-degree hybrid circuit. In FIG. 3C, the occupying area of a 90-degree hybrid circuit with respect to the curvature radius $R_S$ of a curved waveguide is illustrated. The occupying area may be maintained substantially fixed regardless of the bend radius. When the curvature radius is 200 μm, the occupying area, which is represented by numeral 1, may be substantially 1/70 or less the area of the element illustrated in FIG. 2A, which is represented by numeral 2. The waveguides may have any desired shape. The total length of the waveguides may be reduced, and variation caused by the manufacturing process may be reduced.

Figure 3D:
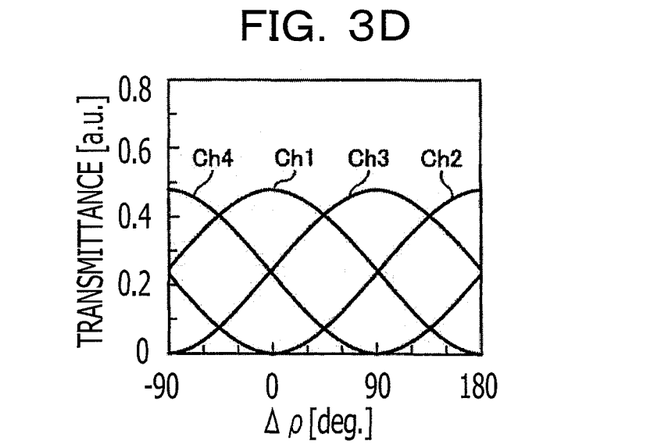
FIG. 3D illustrates an exemplary quadrature response.

FIG. 3D illustrates an exemplary quadrature response. In FIG. 3D, the transmittance characteristic with respect to the relative phase difference $\Delta\rho$ between two light signals is incident on the device. The horizontal axis represents the relative phase difference $\Delta\rho$. The vertical axis represents the transmittance (arbitrary unit) of four channel outputs Ch1 to Ch4. A 90-degree hybrid to be used in simulation may include a high-mesa waveguide structure having an InGaAsP waveguide layer on an InP substrate.

Figure 3E:
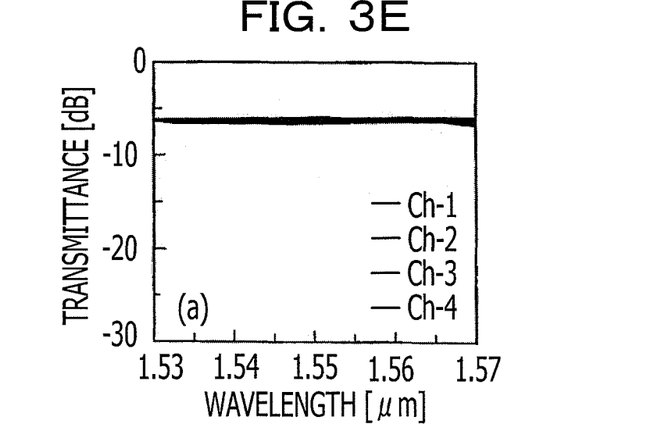
FIG. 3E illustrates an exemplary transmission characteristic.
Figure 3F:
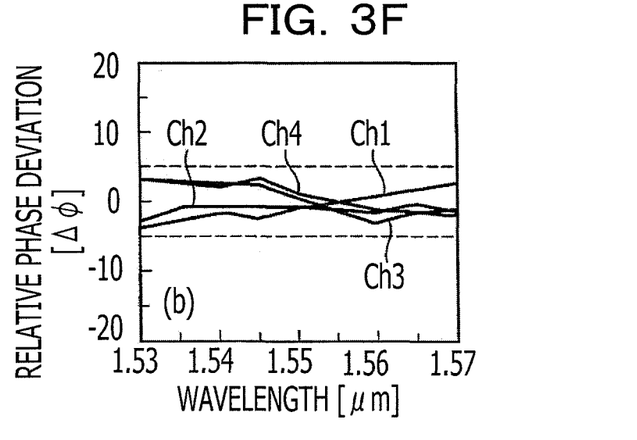
FIG. 3F illustrates an exemplary relative phase deviation characteristic.

FIG. 3E illustrates an exemplary transmission characteristic. FIG. 3F illustrates an exemplary relative phase deviation characteristic. The transmission characteristic illustrated in FIG. 3E and the relative phase deviation characteristic illustrated in FIG. 3F may be the transmission amplitude characteristic and relative phase shift ($\Delta\phi$) characteristic of the 90-degree hybrid circuit illustrated in FIG. 1A. In FIGS. 3E and 3F, the horizontal axis represents the wavelength of the C-band. In FIG. 3E, the vertical axis represents the transmission characteristic. In FIG. 3F, the vertical axis represents the relative phase deviation ($\Delta\phi$) characteristic. In the branching characteristic illustrated in FIG. 3E, the interchannel imbalance is reduced to 0.4 dB or less regardless of the wavelength. In FIG. 3E, four components having substantially equivalent intensities, which have been obtained by division, are illustrated. The relative phase shifts of all the channels illustrated in FIG. 3F are not greater than ±5 degrees in the C-band. Typically, phase shifts of ±5 degrees or less may be demodulated.

Figure 4:
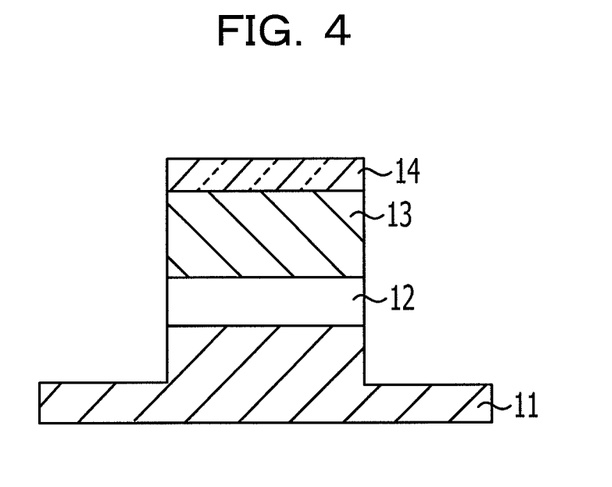
FIG. 4 illustrates an exemplary process for manufacturing a 90-degree hybrid circuit.

FIG. 4 illustrates an exemplary process for manufacturing a 90-degree hybrid circuit. An undoped GaInAsP layer 12 having a thickness of approximately 0.3 μm is formed on An n-type InP substrate 11 by, for example, metal-organic vapor phase epitaxy (MOVPE) method, and a p-type InP layer 13 having a thickness of approximately 2.0 μm is formed on the GaInAsP layer 12. The GaInAsP layer 12 may have an emission wavelength of 1.3 μm. A $SiO_2$ film or the like is formed on the p-type InP layer 13 by sputtering or the like, and the $SiO_2$ film is etched to a desired shape by using a photoresist pattern to form a hard mask 14. The hard mask 14 is used as an etching mask, and a high-mesa structure having a height of approximately 3.0 μm is formed by dry etching such as inductively coupled plasma (ICP) reactive ion etching. Optical couplers, waveguides, and other suitable elements are patterned to form a 90-degree hybrid circuit.

For example, a 2:2 optical coupler may be an MMI coupler. In order to obtain a branching ratio of 50:50, the waveguide width may be set to 2.0 μm, the waveguide array pitch of the MMI coupler may be set to 1.0 μm, the width of the MMI coupler may be set to 5.0 μm, and the length of the MMI coupler may be set to 105 μm. For the purpose of optimization, the amount of shift $\phi k$ of a phase shifter may be determined by numerical analysis based on a beam propagation method. It may be estimated that $\phi_{EX}$ be −0.816π (radian). The optimum amount of shift $\phi k$ may be represented by the following formula:

$$\phi k=(3\pi/2)+2\cdot(-0.816\pi)=-0.132\pi(\text{radian}).$$

When the amount of shift of the phase shifter PS illustrated in FIG. 3A is set to −0.132π, the characteristic illustrated in FIG. 3D may be obtained. Excess loss or crosstalk may be reduced, and a desired 90-degree hybrid may be provided.

A local oscillation light source, a photodiode, a logic circuit, or the like may be fabricated on an InP substrate together with a 90-degree hybrid circuit. A 90-degree hybrid circuit may be formed on a silicon-on-insulator (SOI) substrate in which a Si layer and a dielectric layer such as a silicon dioxide layer are formed on a Si substrate with the dielectric layer between the Si layer and the Si substrate. A GaAs substrate may also be used A 90-degree optical hybrid circuit having any desired configuration may be used.

Figure 5A:
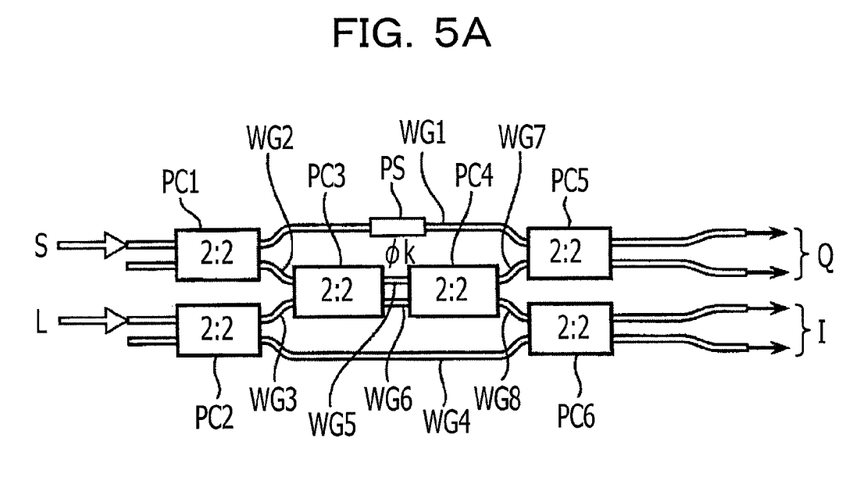
FIGS. 5A to 5D illustrate an exemplary optical hybrid circuit.

FIGS. 5A to 5D illustrate an exemplary optical hybrid circuit. In FIG. 5A, the phase shifter PS may be provided in the waveguide WG1 instead of in the waveguide WG4. The phase shifter PS may be placed in an arm of the lower Mach-Zehnder interferometer or in an arm of the upper Mach-Zehnder interferometer. The in-phase components and the quadrature components are swapped each other as compared with those in FIG. 3A. The element sizes and characteristics may be substantially the same as or similar to those in FIG. 3A.

Figure 5B:
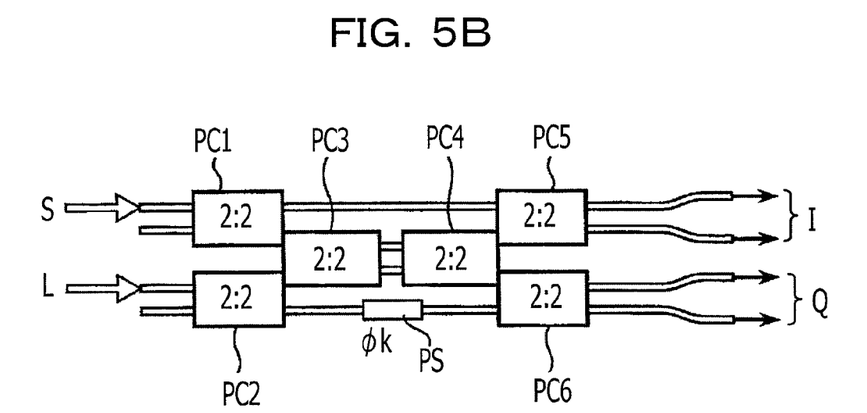

In FIG. 5B, the optical coupler PC3 is coupled directly to the optical couplers PC1 and PC2 without using the optical waveguides between the input channels of the optical coupler PC3 and the output channels of the optical couplers PC1 and PC2.

Figure 5C:
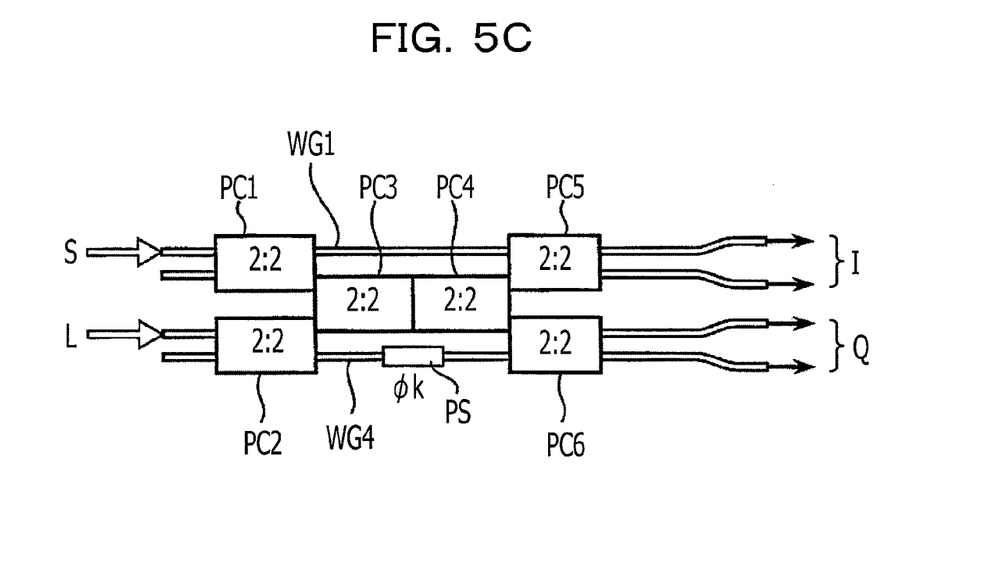

In FIG. 5C, the optical couplers PC3 and PC4 are coupled directly to each other without using the optical waveguides between the optical couplers PC3 and PC4. A smaller 90-degree hybrid circuit may thus be fabricated.

Figure 5D:
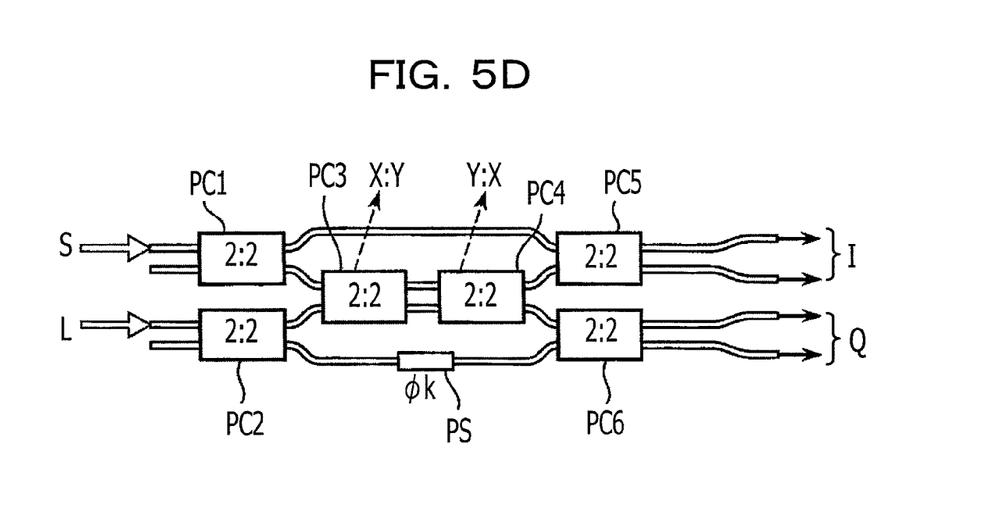

In FIG. 5D, the branching ratios of the optical couplers PC3 and PC4 coupled in series may not be set to 50:50 but to X:Y and Y:X, respectively. For example, X may be set to be equal to 85 and Y may be set to be equal to 15. Even if the branching ratios of the optical couplers PC3 and PC4 are set to Y:X and X:Y, respectively, substantially the same or similar results may be obtained. Any desired ratio may be set.

Figure 6:
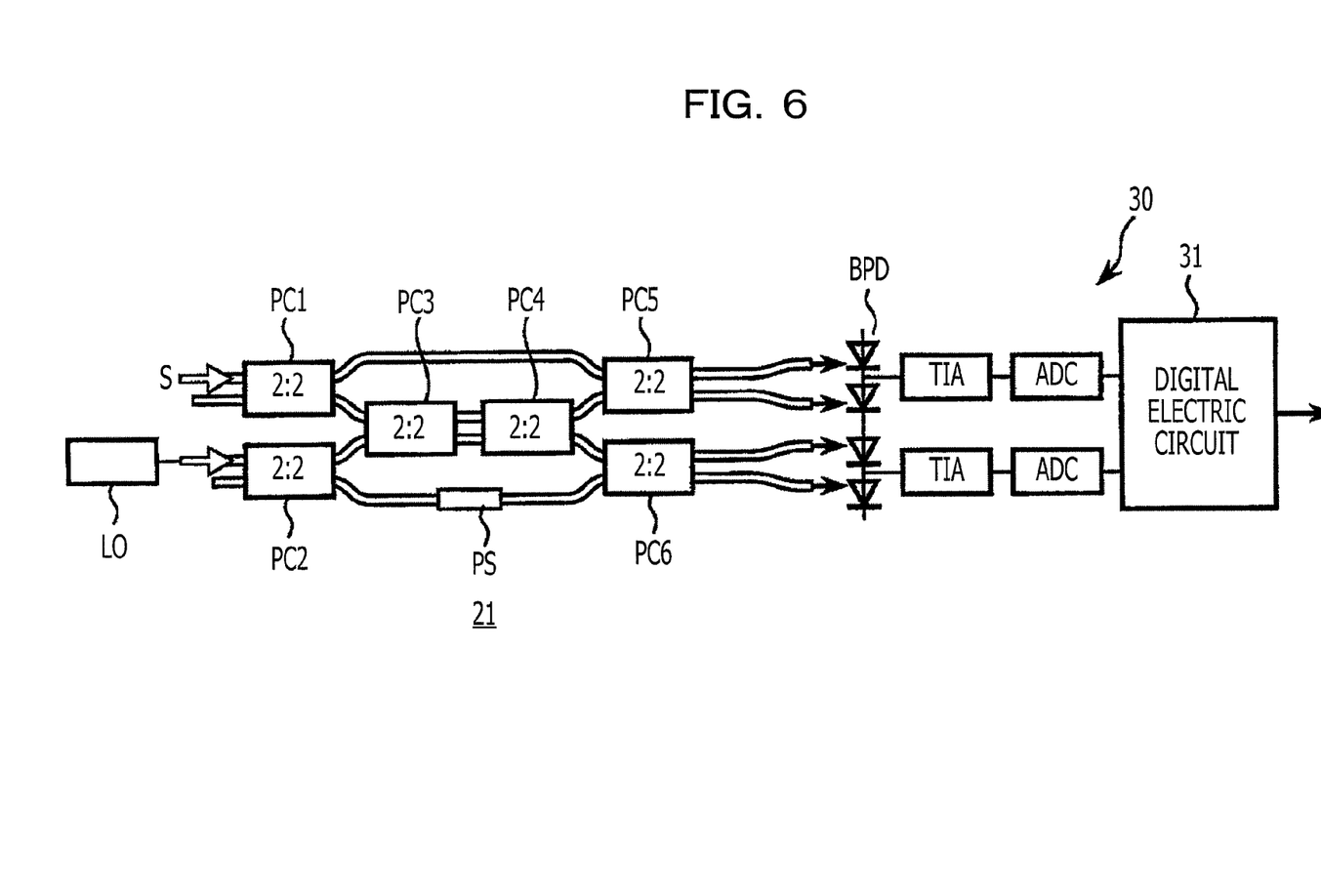
FIG. 6 illustrates an exemplary optical receiver.

FIG. 6 illustrates an exemplary optical receiver. For example, a reference light local oscillator LO is placed on the input side of a 90-degree hybrid circuit 21 having the structure illustrated in FIG. 3A. Reference light is supplied to an input channel of the second optical coupler PC2. Two pairs of outputs of the 90-degree hybrid circuit 21 are differentially detected by balanced photodiodes BPD, and the two pairs of outputs are supplied to analog-to-digital converters ADC through trans-impedance amplifiers TIA. The analog-to-digital converters ADC convert the signals input into digital signals, and a logic circuit 31 performs a logical operation based on the digital signals. The local oscillator LO, the optical couplers PC, and the optical waveguides WG may be referred to as an optical circuit 20, and the balanced photodiodes BPD and the following circuit portions may be referred to as an electronic circuit 30.

Figure 7:
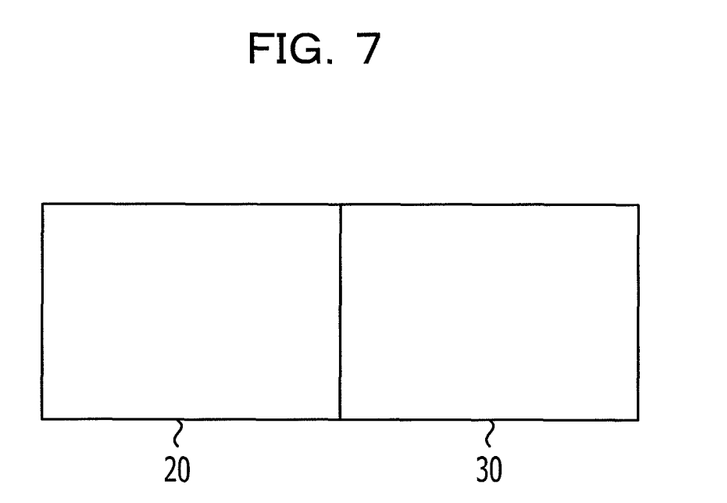
FIG. 7 illustrates an exemplary optical receiver.

FIG. 7 illustrates an exemplary optical receiver. As illustrated in FIG. 7, the region of the optical circuit 20 illustrated in FIG. 6 and the region of the electronic circuit 30 illustrated in FIG. 6 may be formed on an InP substrate, and an integrated optical receiver may be provided.

Figure 8:
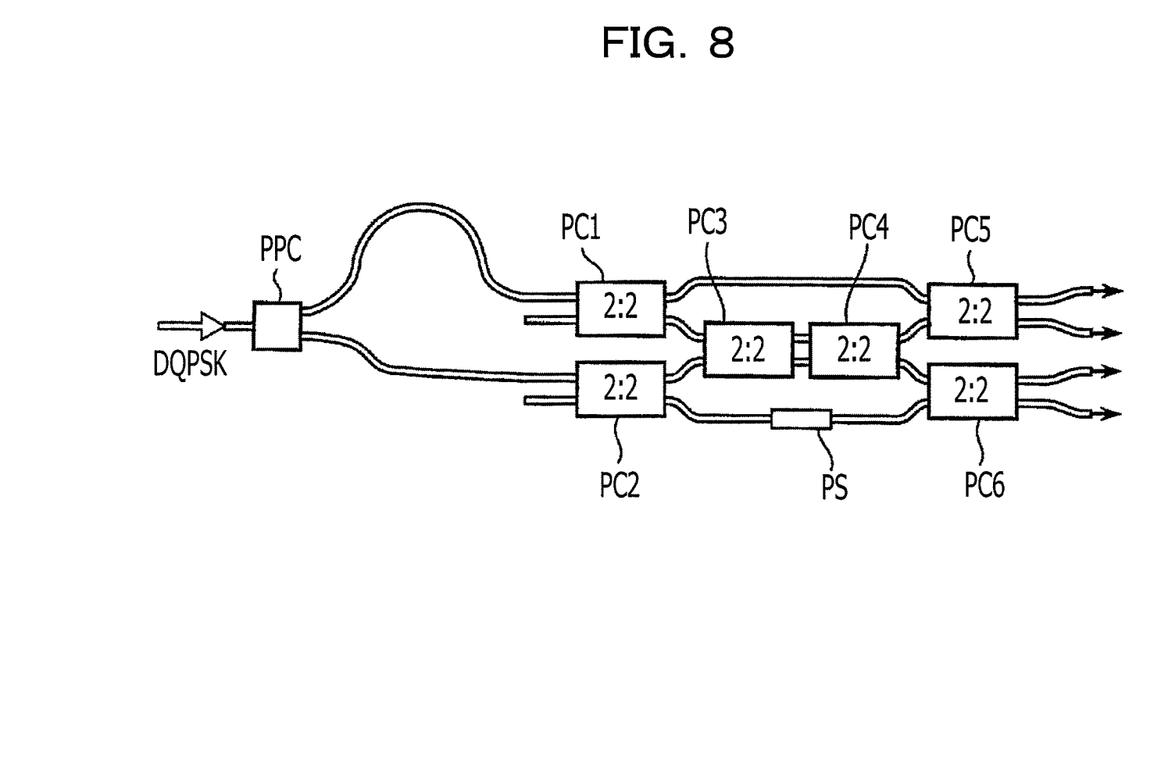
FIG. 8 illustrates an exemplary optical hybrid circuit.

FIG. 8 illustrates an exemplary optical hybrid circuit. In FIG. 8, no reference light sources may be used. A 1:2 MMI coupler PPC having an optical path length difference between arms thereof is provided before the 90-degree hybrid circuit 21. A differential phase shift keying signal such as differential quadrature phase shift keying (DQPSK) signal light is supplied to the 1:2 MMI coupler PPC. A delay corresponding to one bit of a pulse of the DQPSK signal light is given to one of the arms, and two inputs of the following elements are formed. The pulses of the signal light propagate through the 1:2 MMI coupler PPC, and are supplied to two paths. The light signals in the two paths form a phase difference $\delta\rho$, and may interfere. The operation of the elements after the 1:2 MMI coupler PPC may be substantially the same as or similar to the operation of the 90-degree hybrid illustrated in FIG. 3A or 3B.

Figure 9:
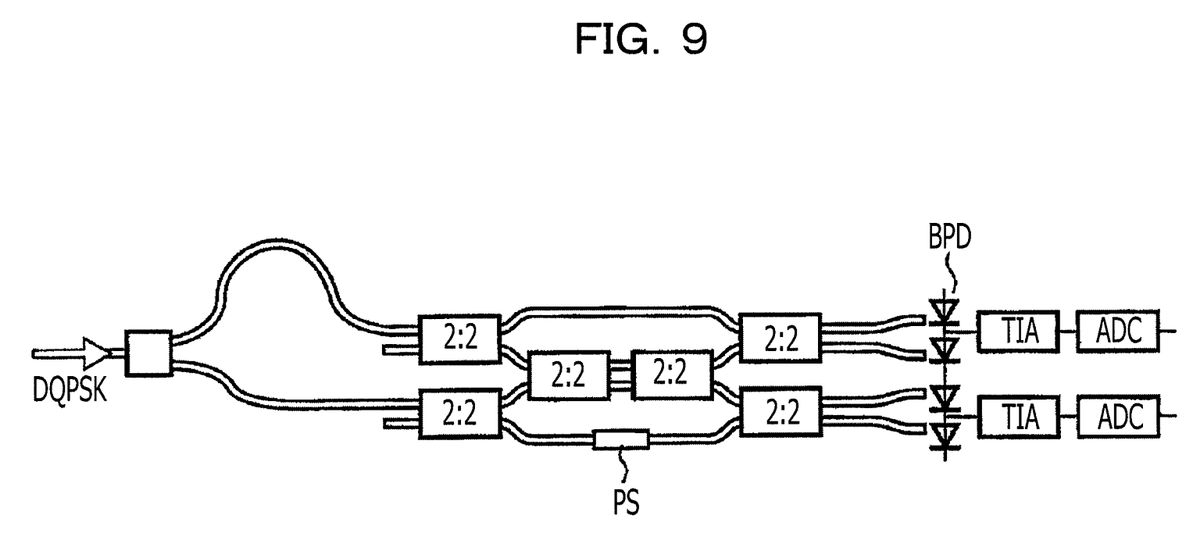
FIG. 9 illustrates an exemplary optical receiver.

FIG. 9 illustrates an exemplary optical receiver. The optical receiver illustrated in FIG. 9 may include the 90-degree hybrid circuit 21 illustrated in FIG. 8. The 1:2 MMI coupler PPC rather than the local oscillator LO illustrated in FIG. 6 may be used. The operation of the 1:2 MMI coupler PPC may be substantially the same as or similar to the operation of the local oscillator LO.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical hybrid circuit comprising:
a first optical coupler including a first input channel, a second input channel, a first output channel, and a second output channel;
a second optical coupler, provided substantially parallel to the first optical coupler, including a third input channel, a fourth input channel, a third output channel, and a fourth output channel;
a third optical coupler including a fifth input channel, a sixth input channel, a fifth output channel, and a sixth output channel, the fifth input channel being coupled to the second output channel, and the sixth input channel being coupled to the third output channel;
a fourth optical coupler including a seventh input channel, an eighth input channel, a seventh output channel, and an eighth output channel, the seventh input channel being coupled to the fifth output channel, the eighth input channel being coupled to the sixth output channel;
a fifth optical coupler including a ninth input channel, a tenth input channel, a ninth output channel, and a tenth output channel, the ninth input channel being coupled to the first output channel, the tenth input channel being coupled to the seventh output channel; and
a sixth optical coupler including an eleventh input channel, a twelfth input channel, an eleventh output channel, and a twelfth output channel, the eleventh input channel being coupled to the eighth output channel, the twelfth input channel being coupled to the fourth output channel.

2. The optical hybrid circuit according to claim 1, wherein an optical length of a first path from the seventh output channel and the eighth output channel to the tenth input channel is substantially equal to an optical length of a second path from the seventh output channel and the eighth output channel to the eleventh input channel,
wherein an optical length of a third path from the first output channel to the ninth input channel is substantially equal to an optical length of a fourth path form the fourth output channel to the twelfth input channel, and
wherein an optical length of a fifth path from the second output channel to the tenth input channel through the third optical coupler and the fourth optical coupler is substantially equal to an optical length of the third path and the fourth path.

3. The optical hybrid circuit according to claim 1, wherein each of the first to sixth optical couplers is a multimode interference coupler.

4. The optical hybrid circuit according to claim 1, further comprising:
a first waveguide that couples the first output channel and the ninth input channel; and
a fourth waveguide that couples the fourth output channel and the twelfth input channel.

5. The optical hybrid circuit according to claim 4, further comprising:
a second waveguide that couples the second output channel and the fifth input channel;
a third waveguide that couples the third output channel and the sixth input channel;
a fifth waveguide that couples the fifth output channel and the seventh input channel;
a sixth waveguide that couples the sixth output channel and the eighth input channel;
a seventh waveguide that couples the seventh output channel and the tenth input channel; and
an eighth waveguide that couples the eighth output channel and the eleventh input channel.

6. The optical hybrid circuit according to claim 4, wherein the fifth input channel is coupled directly to the second output channel, the sixth input channel is coupled directly to the third output channel, the seventh output channel is coupled directly to the tenth input channel, and the eighth output channel is coupled directly to the eleventh input channel.

7. The optical hybrid circuit according to claim 6, further comprising:
a fifth waveguide that couples the fifth output channel and the seventh input channel; and
a sixth waveguide that couples the sixth output channel and the eighth input channel.

8. The optical hybrid circuit according to claim 6, wherein the seventh input channel is coupled directly to the fifth output channel, and
the eighth input channel is coupled directly to the sixth output channel.

9. The optical hybrid circuit according to claim 4, wherein the first waveguide or the fourth waveguide includes a phase controller.

10. The optical hybrid circuit according to claim 9, wherein the phase controller performs phase control so that a phase difference between two signals input to the fifth optical coupler and a phase difference between two signals input to the sixth optical coupler are shifted by $\pi/2$ with each other.

11. The optical hybrid circuit according to claim 1, wherein each of the first to sixth optical couplers splits an input signal into signals at a substantially equal branching ratio.

12. The optical hybrid circuit according to claim 1, wherein
each of the first optical coupler, the second optical coupler, the fifth optical coupler, and the sixth optical coupler splits an input signal into signals at a substantially equal branching ratio,
the third optical coupler splits an input signal into signals at a ratio of X:Y, and
the fourth optical coupler splits an input signal into signals at a ratio of Y:X.

13. The optical hybrid circuit according to claim 1, further comprising,
an input optical coupler includes;
one input channel; and
two output channels coupled to one of input channels of the first optical coupler and one of input channels of the second optical coupler, the two channels having a phase difference.

14. An optical receiver comprising:
a semiconductor substrate including an optical region and an electronic region;
a waveguide layer, provided in the optical region, having a first refractive index;
cladding layers sandwiching the waveguide layer and having a second refractive index lower than the first refractive index; and
an optical hybrid circuit,
wherein the optical hybrid circuit includes:
a first optical coupler including a first input channel, a second input channel, a first output channel, and a second output channel;
a second optical coupler, provided substantially parallel to the first optical coupler, including a third input channel, a fourth input channel, a third output channel, and a fourth output channel;
a third optical coupler including a fifth input channel, a sixth input channel, a fifth output channel, and a sixth output channel, the fifth input channel being coupled to the second output channel, and the sixth input channel being coupled to the third output channel;

a fourth optical coupler including a seventh input channel, an eighth input channel, a seventh output channel, and an eighth output channel, the seventh input channel being coupled to the fifth output channel, the eighth input channel being coupled to the sixth output channel;
a fifth optical coupler including a ninth input channel, a tenth input channel, a ninth output channel, and a tenth output channel, the ninth input channel being coupled to the first output channel, the tenth input channel being coupled to the seventh output channel; and
a sixth optical coupler including an eleventh input channel, a twelfth input channel, an eleventh output channel, and a twelfth output channel, the eleventh input channel being coupled to the eighth output channel, the twelfth input channel being coupled to the fourth output channel.

15. The optical receiver according to claim 14, wherein an optical length of a first path from the seventh output channel and the eighth output channel to the tenth input channel is substantially equal to an optical length of a second path from the seventh output channel and the eighth output channel to the eleventh input channel,
wherein an optical length of a third path from the first output channel to the ninth input channel is substantially equal to an optical length of a fourth path form the fourth output channel to the twelfth input channel, and
wherein an optical length of a fifth path from the second output channel to the tenth input channel through the third optical coupler and the fourth optical coupler is substantially equal to an optical length of the third path and the fourth path.

16. The optical receiver according to claim 14, further comprising:
an input unit, provided in the optical region, configured to supply an input signal to the first optical coupler;
a local oscillation light generator, provided formed in the optical region, configured to supply local oscillation light to the second optical coupler;
a photoelectric converter, provided in the electronic region, configured to convert light from the ninth to twelfth output channels into electrical signals; and
an operation unit, provided in the electronic region, configured to perform operation.

17. The optical receiver according to claim 16, wherein the photoelectric converter includes a plurality of sets of balanced photodiodes.

18. The optical receiver according to claim 14, further comprising,
an input optical coupler provided in the optical region, the input optical coupler having one input channel and two output channels having a phase difference, the two output channels being coupled to one of input channels of the first optical coupler and one of input channels of the second optical coupler.

19. The optical receiver according to claim 14, wherein each of the first to sixth optical couplers is a multimode interference coupler.

20. The optical receiver according to claim 14, further comprising:
a first waveguide that couples the first output channel and the ninth input channel;
a second waveguide that couples the second output channel and the fifth input channel;
a third waveguide that couples the third output channel and the sixth input channel, the third waveguide having substantially the same optical length as the second waveguide;

a fourth waveguide that couples the fourth output channel and the twelfth input channel;
a fifth waveguide that couples the fifth output channel and the seventh input channel;
a sixth waveguide that couples the sixth output channel and the eighth input channel, the sixth waveguide having substantially the same optical length as the fifth waveguide;
a seventh waveguide that couples the seventh output channel and the tenth input channel; and
an eighth waveguide that couples the eighth output channel and the eleventh input channel, the eighth waveguide having substantially the same optical length as the seventh waveguide.

* * * * *